No. 752,873. PATENTED FEB. 23, 1904.
H. G. SWEENEY.
FILTER.
APPLICATION FILED AUG. 4, 1902.
NO MODEL.

Witnesses:
Wm. Geiger
H. M. Munday

Inventor:
Henry G. Sweeney
By Munday, Evarts & Adcock
Attorneys

No. 752,873. Patented February 23, 1904.

UNITED STATES PATENT OFFICE.

HENRY G. SWEENEY, OF CHICAGO, ILLINOIS.

FILTER.

SPECIFICATION forming part of Letters Patent No. 752,873, dated February 23, 1904.

Application filed August 4, 1902. Serial No. 118,251. (No model.)

*To all whom it may concern:*

Be it known that I, HENRY G. SWEENEY, a citizen of the United States, residing in Chicago, in the county of Cook and State of Illinois, have invented a new and useful Improvement in Filters, of which the following is a specification.

This invention relates to that class of water-filters in which a cylinder of filtering-stone or similar material is suspended in a chamber or vessel which receives the unfiltered water from below and delivers it at its top after it has percolated up through the stone. As heretofore constructed the delivery-pipe by which the filtered water is carried away from the vessel to a reservoir or to a conveniently-located faucet has been attached to the screw cap or cover of the vessel, and consequently it has been necessary to disconnect the pipe from the cap each time the latter is removed to permit the taking out and cleaning of the filtering-stone. This is not only inconvenient, but leads to trouble, because of the lack of skill and care on the part of the domestics and other people who usually have charge of the filters in reconnecting the pipe after cleaning the stone.

To avoid the necessity of thus disconnecting and reconnecting the delivery-pipe each time the stone is cleaned is my main object in the present invention, and that result is accomplished by providing in the top of the main chamber or vessel and below the screw-cap thereof an annular chamber extending around the top of the stone or filtering device and receiving the filtered water therefrom and connecting the discharge-pipe to this annular chamber instead of the cap, which is thus left free to be removed without any breaking of the water connection. This and other features of the invention are fully described below and also illustrated in the accompanying drawings, in which—

Figure 1:
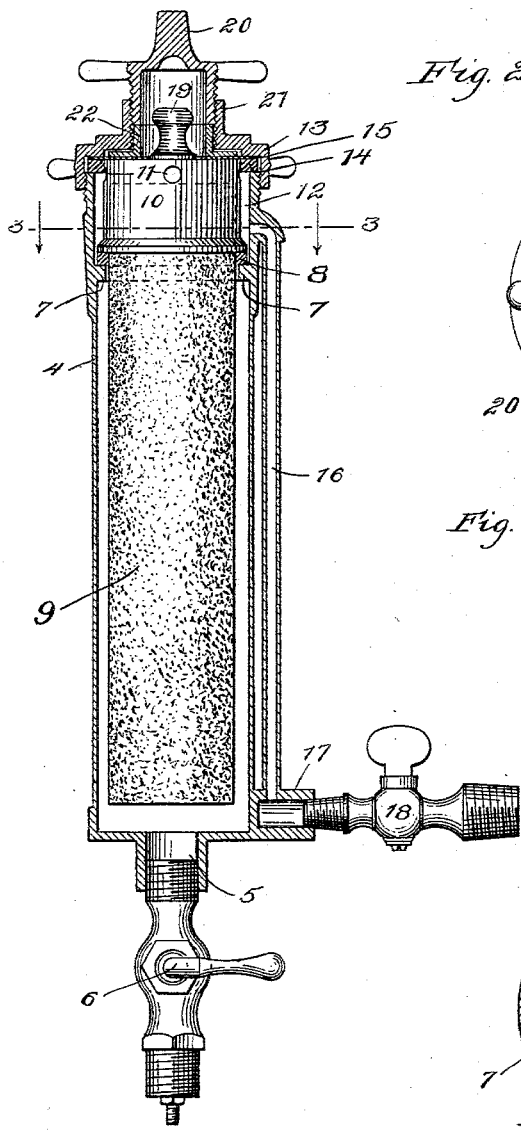
Figure 2:
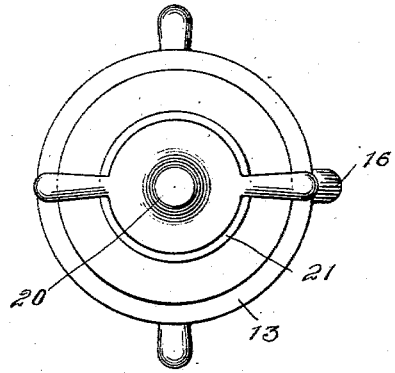
Figure 4:
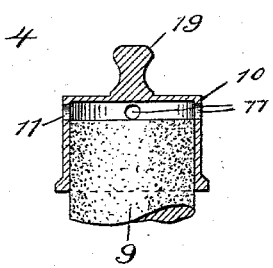
Figure 3:
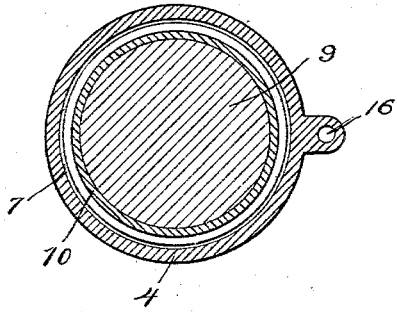

Figure 1 is a vertical section of my improved filter. Fig. 2 is a plan thereof, and Fig. 3 is a section on the line 3 3 of Fig. 1. Fig. 4 is a vertical section of the thimble supporting the stone.

In said drawings, 4 represents a tube forming the main chamber or vessel of the filter. It has a water-inlet 5 at the bottom, closed by a Fuller or other faucet 6. Near the top the tube has an interior annular shoulder or ledge 7, upon which is a rubber gasket 8. The cylinder, either tubular or solid, of filtering material 9 nearly fills the tube 4 and is supported upon the ledge 7. For thus suspending the cylinder it is provided at its upper end with a metal cap or thimble 10, having its lower edge thickened, so as to give it a good bearing on the gasket 8. By this construction I not only support the filtering-cylinder within the main chamber, but I also prevent the unfiltered water from mingling with the filtered water above the gasket. The filtering-cylinder extends upward in the thimble 10 to the point indicated by the dotted line, and the thimble is closed at the top, and its walls above the cylinder are perforated at 11, so that the water rising through the cylinder may pass out from the thimble into the annular collecting chamber or passage 12. This chamber or passage is closed at the bottom by gasket 8 and at the top by the screw cap or cover 13 of the main vessel or tube 4, a gasket 14 being compressed between the cover and the top of tube 4 to render the joint waterproof, and for greater security at this joint I prefer also to place over the thimble and gasket 14 a pure-rubber thin washer 15. The water chamber or passage 12 connects with the discharge-pipe 16, which is preferably extended down along the side of tube 4 to a junction with the nipple 17 receiving the valved coupling 18, whereby the filter may be connected to a pipe leading to a reservoir or other point of discharge.

Secured upon the top of thimble 10 is a knob 19, serving as a means of lifting the filtering-cylinder. The cap 13 has a central opening to give room to the knob, and this opening I close by the screw-stopper 20, entering within the flange 21 surrounding the opening. I also avail myself of this stopper as a means of causing pressure upon the thimble whereby to compress the gasket 8, and for this purpose I insert a flanged ferrule 22 between the thimble and the stopper 20. The ferrule is adapted to carry the pressure to the outer line of the thimble, so that the latter may be forced down onto the gasket 8 without any tightening or disturbance of the joint between the cap 13 and tube 4. In practice the stopper should be turned down after the cap 13 has been tightened to the necessary extent, and the former will then act as a lock on the latter.

It will be understood that the construction shown may be considerably varied without departing from the invention, and I do not wish to be limited thereto.

I claim—

1. The filter having in combination a removable cap, a filtering-cylinder removable upward through the top when the cap is removed, a pipe for carrying off the filtered water, and an annular chamber or passage surrounding the cylinder and serving to collect the filtered water from the top of the cylinder and deliver it to said pipe, substantially as specified.

2. The filter having a filtering-cylinder covered at the top by a metal thimble provided with openings for the escape of the water percolating through the cylinder, a collecting chamber or passage surrounding the thimble, and a discharge-pipe leading from said chamber or passage, substantially as specified.

3. The filter wherein are combined a tube or casing 4, a removable cap for the tube, a cylinder of filtering material having secured to it an outstanding rim or projection resting on a gasket supported by an interior shoulder of the tube, and means whereby said gasket may be compressed without any tightening of the cap, substantially as specified.

4. The filter wherein are combined the removable cap, the screw-stopper carried by the cap, the cylinder of filtering material, the thimble supporting the cylinder, the gasket and ledge supporting the thimble, and means whereby the stopper may cause the compression of the gasket, substantially as specified.

5. The filter wherein are combined the removable cap, the screw-stopper carried by the cap, the cylinder of filtering material, the thimble supporting the cylinder, the gasket and ledge supporting the thimble, and the flanged ferrule whereby the stopper may cause pressure on the thimble, substantially as specified.

6. A filter comprising a casing provided at one end with a removable closure, a filter-tube which is closed at one end, and is arranged in the casing with its open end adjacent to the removable closure of the casing, means affording a tight joint between the open end of the filter-tube and the surrounding wall of the casing, and inlet and exit pipes, permanently connected with the casing and opening into the interior of the same at opposite sides of the said joint between the open end of the tube and the casing.

7. A filter comprising a casing provided with a removable closure, a filter-tube therein provided with a permanently-attached cap which is provided with holes for the passage of water from the interior of the tube; the space between the casing and tube being divided into two chambers, one of which surrounds the filter-tube and is provided with an inlet-opening, and the other of which communicates with the interior of the tube through the holes in the filter-tube cap and is provided with an exit-opening.

8. A filter comprising a casing with a removable closure, and a filter-tube therein provided with a permanently-attached apertured cap, which, when within the casing, forms with the latter a water-chamber separate from the space which surrounds the filter-tube; said casing being provided with an inlet-opening communicating with the space which surrounds the filter-tube and with an exit-opening communicating with the chamber between the cap and casing.

9. The combination with a cylinder-casing provided at one end with a removable closure, of a filter-tube provided with a permanently-attached, apertured cap, the inner margin of which, when the tube and cap are in place within the casing, forms a tight joint with the surrounding casing, said casing being provided with inlet and exit apertures located at opposite sides of the joint between the filter-tube cap and the casing.

10. The combination with a cylindric casing, provided at one end with a removable closure, of a filter-tube provided with a permanently-attached cap, said casing and cap being provided with means affording a tight joint between the inner part of the cap and the casing and a tight joint between the outer end of the cap and the casing so as to form a water-chamber surrounding the cap.

11. The combination with a cylindric casing provided with a removable closure and with an interior, outwardly-facing shoulder, a filter-tube provided with a permanently-attached apertured cap having an inwardly-facing shoulder, a packing-ring interposed between the shoulder on the casing and cap, and means for forcing the cap toward the shoulder on the casing to compress the said packing-ring between the said shoulders.

12. The combination with a cylindric casing provided with a removable closure, of a filter-tube provided with a permanently-attached cap, the inner margin of which is adapted to form a tight joint with the casing when the tube and its cap are in place within the casing, said cap having holes in its side wall, and a packing-ring interposed between the outer end of the cap, and the adjacent wall of the casing.

13. The combination with a cylindric casing, of a filter-tube provided with a permanently-attached cap, the inner margin of which is adapted to form a tight joint with the casing, said casing being provided with a closure which fits upon the open end of the casing, and a packing-ring which surrounds the filter-tube cap and is clamped between opposite surfaces on the casing and closure.

14. The combination with a cylindric casing, of a filter-tube provided with a permanently-attached cap, said casing being provided with an outwardly-facing internal shoulder and the cap with an opposing, inwardly-facing shoulder, a packing-ring interposed between the shoulders, a closure detachably secured to said casing and a screw-plug passing through the said closure and acting on the cap.

15. The combination with a cylindric casing provided with an outwardly-facing, internal shoulder, of a filter-tube provided with a permanently-attached cap having an inwardly-facing shoulder, a packing-ring interposed between said shoulders, a closure for the casing having screw-threaded connection with the end of the same, a screw-plug which passes through the said closure and acts endwise on the filter-tube cap, and a packing-ring which forms a tight joint between the said cap and the casing and also between the closure and the casing.

16. The combination with a cylindric casing provided with an outwardly-facing internal shoulder, of a filter-tube provided with a permanently-attached cap having an inwardly-facing shoulder and a knob on its end wall, a packing interposed between said shoulders, a closure for the casing and a screw-plug which passes through the closure and is made hollow to receive the said knob, and a tube interposed between the inner end of said screw-plug and the end wall of the filter-tube cap.

17. A filter comprising a cylindric casing, closed at one end and open at the other, said casing having an outwardly-facing internal shoulder, a filter-tube provided with a permanently-attached cap, which is perforated for the passage of water from the interior of the tube and is provided with an inwardly-facing shoulder, a packing-ring interposed between said shoulders, a closure for the open end of the casing, a packing-ring interposed between the closure and the casing, said packing-ring being arranged to also form a tight joint between the filter-tube cap and the casing, and a screw-plug which is inserted through the closure and acts endwise on the filter-tube cap, a water-supply pipe connected with the casing and communicating with the space between the same and the filter-tube and an exit-pipe also connected with the casing and communicating with the space between the filter-tube cap and the casing.

HENRY G. SWEENEY.

Witnesses:
H. M. MUNDAY,
EDW. S. EVARTS.